United States Patent
Park

(10) Patent No.: US 8,964,518 B2
(45) Date of Patent: Feb. 24, 2015

(54) DATA RECORDING APPARATUS AND METHOD USING 3D OPTICAL MEMORY, AND AUTHENTICATION APPARATUS AND METHOD USING 3D OPTICAL MEMORY

(71) Applicant: Electronics and Telecommunications Research Institute, Daejeon (KR)

(72) Inventor: CheolYong Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/091,529

(22) Filed: Nov. 27, 2013

(65) Prior Publication Data

US 2014/0321254 A1    Oct. 30, 2014

(30) Foreign Application Priority Data

Apr. 26, 2013 (KR) .......... 10-2013-0046466

(51) Int. Cl.
| | |
|---|---|
| *G11B 7/0065* | (2006.01) |
| *G11B 7/007* | (2006.01) |
| *G06K 9/00* | (2006.01) |
| *G11B 7/1362* | (2012.01) |
| *G11B 7/1395* | (2012.01) |

(52) U.S. Cl.
CPC .......... *G11B 7/00772* (2013.01); *G11B 7/0065* (2013.01); *G11B 7/1362* (2013.01); *G11B 7/1395* (2013.01); *G06K 9/00013* (2013.01)
USPC ..... 369/103; 369/112.29; 359/30; 359/223.1; 365/125; 365/216

(58) Field of Classification Search
None
See application file for complete search history.

(56) References Cited

U.S. PATENT DOCUMENTS

| | | | |
|---|---|---|---|
| 5,416,616 A * | 5/1995 | Jenkins et al. | ............ 359/11 |
| 7,031,472 B1 | 4/2006 | Noda | |
| 2008/0165604 A1* | 7/2008 | Kim et al. | ............ 365/216 |

FOREIGN PATENT DOCUMENTS

| | | |
|---|---|---|
| JP | 05-173469 A | 7/1993 |
| JP | 2000-163873 A | 6/2000 |
| JP | 2001-067666 A | 3/2001 |
| JP | 2006-172582 A | 6/2006 |
| JP | 2006-349831 A | 12/2006 |
| JP | 2007-280552 A | 10/2007 |
| JP | 2011-013531 A | 1/2011 |
| KR | 10-2001-0071211 A | 7/2001 |
| WO | 99/57719 A1 | 11/1999 |

* cited by examiner

*Primary Examiner* — Wayne Young
*Assistant Examiner* — Brian Butcher
(74) *Attorney, Agent, or Firm* — LRK Patent Law Firm

(57) ABSTRACT

A data recording apparatus and method using three dimensional (3D) optical memory and an authentication apparatus and method using 3D optical memory are provided. The data recording apparatus includes a recording excitation light splitting unit, a condition storage unit, and a data recording unit. The recording excitation light splitting unit splits recording excitation light into first split light and second split light. The condition storage unit stores recording conditions including information about the waveforms, wavelengths and phases of the split light and information about an arrangement of reflection mirrors configured to reflect the split light. The data recording unit records storage data by making the split light incident on the 3D optical memory through the reflection mirrors under the recording conditions.

12 Claims, 5 Drawing Sheets

DATA RECORDING APPARATUS AND METHOD USING 3D OPTICAL MEMORY, AND AUTHENTICATION APPARATUS AND METHOD USING 3D OPTICAL MEMORY

CROSS REFERENCE TO RELATED APPLICATION

This application claims the benefit of Korean Patent Application No. 10-2013-0046466, filed on Apr. 26, 2013, which is hereby incorporated by reference in its entirety into this application.

BACKGROUND OF THE INVENTION

1. Technical Field

The present invention relates generally to a data recording apparatus and method using three dimensional (3D) optical memory and an authentication apparatus and method using 3D optical memory and, more particularly, to a data recording apparatus and method using 3D) optical memory and an authentication apparatus and method using 3D optical memory, which record storage data on 3D optical memory, restore the recorded storage data, and perform authentication.

2. Description of the Related Art

As user demands for authentication are increased recently, authentication methods, such as graphic authentication and fingerprint authentication, are being widely used.

In general, memory that is used to store graphics and fingerprints in order to perform graphic authentication and fingerprint authentication is two dimensional (2D) memory. The 2D memory is problematic in that additional data recording needs to be performed whenever authentication data is updated. Furthermore, the 2D memory is problematic in that the time it takes to perform authentication increases because the time it takes to compare storage data with authentication data increases in proportion to an increase in the amount of the storage data.

Accordingly, authentication through the rapid comparison of storage data with authentication data is a very important factor in data recording and authentication technology using memory.

International Publication No. WO 99/57719 relates to an apparatus and method for recording data on a holographic recording medium and reading data from the holographic recording medium and a holographic data memory system, and introduces technology for performing high-precision storage and restoration using 2D optical memory.

Data recording technology using such conventional memory, however, still has the inherent problem of 2D memory that requires additional data recording whenever authentication data is updated in the case where the data recording technology is applied to authentication technology, and does not disclose or suggest a configuration using 3D optical memory.

Accordingly, there is an urgent need for new data recording and authentication technology using 3D optical memory, which enables more high-precision recording by recording different storage data in a multiplex manner in such a way as to change information about the waveforms, wavelengths and phases of light used upon recording, information about the rotation of an excitation light source, and recording coordinates within 3D optical memory in various ways, enables more rapid recording and restoration by recording and restoring storage data through parallel processing in different recording directions, and solves a problem in which additional data recording is required each time by using restoration data that is a combination of already recorded storage data in data recording and authentication using memory.

SUMMARY OF THE INVENTION

Accordingly, the present invention has been made keeping in mind the above problems occurring in the prior art, and an object of the present invention is to enable more high-precision recording by recording different storage data in a multiplex manner in such a way as to change information about the waveforms, wavelengths and phases of light used upon recording, information about the rotation of an excitation light source, and recording coordinates within 3D optical memory in various ways, using 3D optical memory.

Another object of the present invention is to enable more rapid recording and restoration by recording and restoring storage data through parallel processing in different recording directions.

Still another object of the present invention is to enable safer authentication using high-complexity recording conditions, such as information about the waveforms, wavelengths and phases of light used upon recording, information about the rotation of an excitation light source, and recording coordinates within 3D optical memory, as restoration conditions.

Yet another object of the present invention is to enable authentication data to be updated more conveniently using restoration data, that is, a combination of already recorded storage data, by solving a problem in which additional data recording is required whenever authentication data is updated in the case where 2D optical memory is used.

In accordance with an aspect of the present invention, there is provided a data recording apparatus using 3D optical memory, including a recording excitation light splitting unit configured to split recording excitation light into first split light and second split light; a condition storage unit configured to store recording conditions including information about the waveforms, wavelengths and phases of the split light and information about an arrangement of reflection mirrors configured to reflect the split light; and a data recording unit configured to record storage data by making the split light incident on the 3D optical memory through the reflection mirrors under the recording conditions.

The recording conditions may further include information about the incident locations and angles of the split light incident on the 3D optical memory.

The data recording unit may record the storage, data on the 3D optical memory through parallel processing in different recording directions.

The data recording unit may record the storage data in a multiplex manner under a plurality of recording conditions.

The data recording unit may perform diffused reflection on the second split light using a 3D subject, and may make resulting light incident on the 3D optical memory through a lens.

In accordance with another aspect of the present invention, there is provided an authentication apparatus using 3D optical memory, including a restoration excitation light splitting unit configured to split restoration excitation light into first split light and second split light; a data restoration unit configured to restore storage data by making the first split light incident on the 3D optical memory through a reflection mirror under the recording conditions including information about the waveforms, wavelengths and phases of the split light, information about a rotation of an excitation light source, and information about an arrangement of a reflection mirror configured to reflect the first split light, which have been stored by a data recording apparatus using 3D optical memory; and an authentication execution unit configured to perform an authentication procedure using the restored storage data and previously registered authentication data.

The recording conditions may further include information about the incident locations and angles of the split light incident on the 3D optical memory.

The data restoration unit may restore the storage data on the 3D optical memory through parallel processing in different recording directions.

The data restoration unit may restore the storage data, recorded by the data recording apparatus using 3D optical memory in a multiplex manner under a plurality of recording conditions, under the plurality of recording conditions.

The data restoration unit may restore combination data of one or more of the storage data recorded by the data recording apparatus using 3D optical memory in a multiplex manner under a plurality of recording conditions.

In accordance with still another aspect of the present invention, there is provided a data recording method using 3D optical memory, including splitting recording excitation light into first split light and second split light; storing recording conditions including information about the waveforms, wavelengths and phases of the split light and information about an arrangement of reflection mirrors configured to reflect the split light; and recording storage data by making the split light incident on the 3D optical memory through the reflection mirrors under the recording conditions.

The recording conditions may further include information about the incident locations and angles of the split light incident on the 3D optical memory.

Recording the storage data may include recording the storage data on the 3D optical memory through parallel processing in different recording directions.

Recording the storage data may include recording the storage data in a multiplex manner under a plurality of recording conditions.

Recording the storage data may include performing diffused reflection on the second split light using a 3D subject and making resulting light incident on the 3D optical memory through a lens.

In accordance with yet another aspect of the present invention, there is provided an authentication method using 3D optical memory, including splitting restoration excitation light into first split light and second split light; restoring storage data by making the first split light incident on the 3D optical memory through a reflection mirror under the recording conditions including information about the waveforms, wavelengths and phases of the split light, information about a rotation of an excitation light source, and information about an arrangement of a reflection mirror configured to reflect the first split light, which have been stored by a data recording method using 3D optical memory; and performing an authentication procedure using the restored storage data and previously registered authentication data.

The recording conditions may further include information about incident locations and angles of the split light incident on the 3D optical memory.

Restoring the storage data may include restoring the storage data on the 3D optical memory through parallel processing in different recording directions.

Restoring the storage data may include restoring the storage data, recorded by the data recording method using 3D optical memory in a multiplex manner under a plurality of recording conditions, under the plurality of recording conditions.

Restoring the storage data may include restoring combination data of one or more of the storage data recorded by the data recording method using 3D optical memory in a multiplex manner under a plurality of recording conditions.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
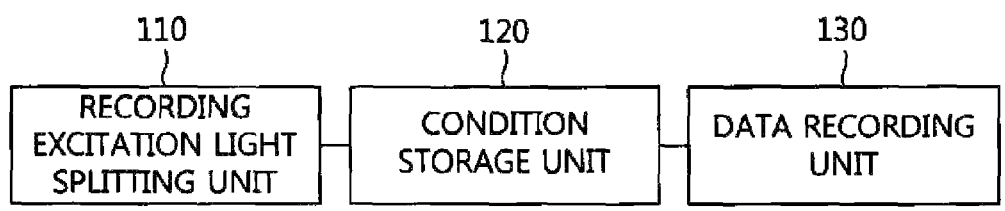
FIG. 1 is a block diagram illustrating a data recording apparatus using 3D optical memory according to an embodiment of the present invention.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

Embodiments of the present invention will be described in detail below with reference to the accompanying drawings.

FIG. 1 is a block diagram illustrating a data recording apparatus using 3D optical memory according to an embodiment of the present invention.

Referring to FIG. 1, the data recording apparatus using 3D optical memory according to this embodiment of the present invention includes a recording excitation light splitting unit 110, a condition storage unit 120, and a data recording unit 130.

The recording excitation light splitting unit 110 splits excitation light 520 into first split light 521 and second split light 522.

The first split light 521 may be reference light, and the second split light 522 may be object light.

The condition storage unit 120 stores recording conditions, including information about the waveforms, wavelengths and phases of the split light 521 and 522, information about the rotation of an excitation light source 510, information about the arrangement of reflection mirrors 541 and 542 configured to reflect the split light 521 and 522, and recording coordinates within 3D optical memory 560.

The recording conditions may further include information about the incident locations and angles of the split light 521 and 522 that are incident onto the 3D optical memory 560.

The recording conditions may further include an identification code if the identification code has been added to storage data by the data recording unit 130.

The data recording unit 130 records storage data by making the split light 521 and 522 incident on the 3D optical memory 560 through the reflection mirrors 541 and 542 in accordance with the recording conditions.

The data recording unit 130 may record interference fringes between the incident split light 521 and 522 on the 3D optical memory 560 as the storage data The data recording unit 130 may record 3D data, that is, interference fringes between the incident split light 521 and 522, on the 3D optical memory 560 as the storage data.

For example, the 3D data may be data arranged in a 3D array form.

The 3D optical memory 560 may be memory using a photorefractive material.

The data recording unit 130 may record the storage data on the 3D optical memory 560 through parallel processing in different recording directions.

The data recording unit 130 may record the storage data in a multiplex manner under a plurality of recording, conditions.

The data recording unit 130 may record the storage data in a multiplex manner by adding an identification code to the storage data.

The data recording unit 130 may perform diffused reflection on the second split light 522 using a 3D subject 551, and may make the resulting light incident on the 3D optical memory 560 through a lens 552.

The data recording unit 130 may record 3D data having the form of the 3D subject 551 as the storage data.

Figure 2:
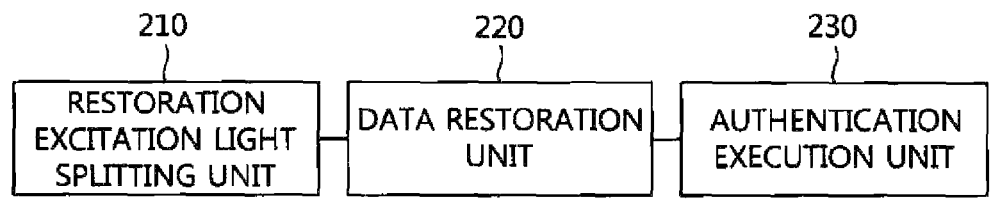
FIG. 2 is a block diagram illustrating an authentication apparatus using 3D optical memory according to an embodiment of the present invention.

FIG. 2 is a block diagram illustrating an authentication apparatus using 3D optical memory according to an embodiment of the present invention.

Referring to FIG. 2, the authentication apparatus using 3D optical memory according to an embodiment of the present invention includes a restoration excitation light splitting unit 210, a data restoration unit 220, and an authentication execution unit 230.

The restoration excitation light splitting unit 210 splits the excitation light 520 into the first split light 521 and the second split light 522.

The first split light 521 may be reference light, and the second split light 522 may be object light.

The data restoration unit 220 restores storage data by making the first split light 521 incident on the 31) optical memory 560 through the reflection mirror 541 in accordance with recording conditions.

The recording conditions include information about the waveform, wavelength and phase of the first split light 521, information about the rotation of the excitation light source 510, information about the arrangement of the reflection mirror 541 configured to reflect the first split light 521, and recording coordinates within 3D optical memory 560, which have been stored by the data recording apparatus using 3D optical memory.

The recording conditions may further include information about the incident location and angle of the first split light 521 that is incident on the 3D optical memory 560.

The recording conditions may further include an identification code if the identification code has been added to the storage data by the data recording apparatus using 3D optical memory.

The data restoration unit 220 may restore 3D data having the form of the 3D subject 551 from the storage data.

For example, the 3D data may be data arranged in a 3D array form.

The 3D optical memory 560 may be memory using a photorefractive material.

The data restoration unit 220 may restore the storage data in the 3D optical memory 560 through parallel processing in different restoration directions.

The data restoration unit 220 may restore the storage data, recorded by the data recording apparatus using 3D optical memory in a multiplex manner under a plurality of recording conditions, under the plurality of recording conditions.

The data restoration unit 220 may restore combination data, that is, a combination of one or more of the storage data recorded by the data recording apparatus using 3D optical memory in a multiplex manner under a plurality of recording conditions.

The authentication execution unit 230 performs an authentication procedure using the restored storage data and previously registered authentication data.

The authentication execution unit 230 may restore the combination data, and may perform an authentication procedure using the restored combination data as the previously registered authentication data.

As described above, the authentication execution unit 230 may update authentication data by restoring combination data based on the combination even without additional data recording.

Figure 3:
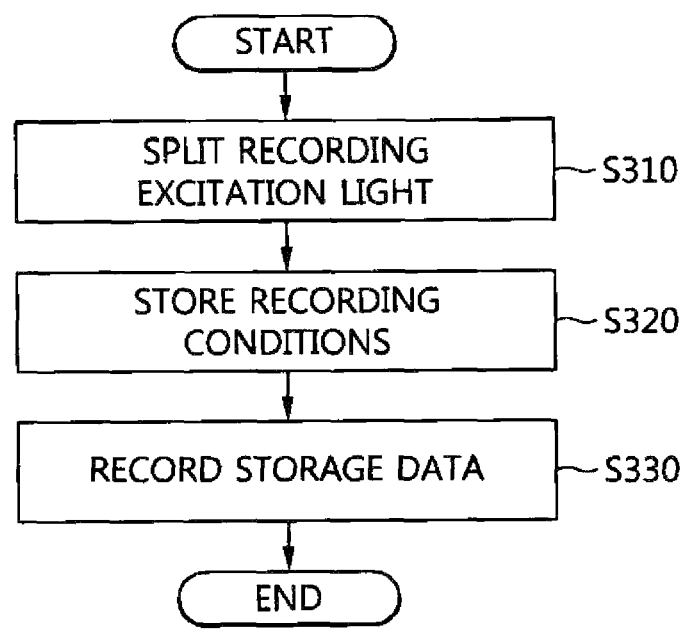
FIG. 3 is a flowchart illustrating a data recording method using 3D optical memory according to an embodiment of the present invention.

FIG. 3 is a flowchart illustrating a data recording method using 3D optical memory according to an embodiment of the present invention.

Referring to FIG. 3, in the data recording method using 3D optical memory according to an embodiment of the present invention, the excitation light 520 is split into the first split light 521 and the second split light 522 at step S310.

The first split light 521 may be reference light, and the second split light 522 may be object light.

Furthermore, in the data recording method using 3D optical memory according to an embodiment of the present invention, recording conditions, including information about the waveforms, wavelengths, and phases of the split light 521 and 522, information about the rotation of the excitation light source 510, information about the arrangement of the reflection mirrors 541 and 542 configured to reflect the split light 521 and 522, and recording coordinates within the 3D optical memory 560, are stored at step S320.

The recording conditions may further include information about the incident locations and angles of the split light 521 and 522 that are incident on the 3D optical memory 560.

The recording conditions may further include an identification code if the identification code has been added to storage data by the data recording unit 130.

Furthermore, in the data recording method using 3D optical memory according to an embodiment of the present invention, storage data is recorded on the 3D optical memory 560 by making the split light 521 and 522 incident on the 3D optical memory 560 through the reflection mirrors 541 and 542 under the recording conditions at step S330.

At step S330, the storage data may be recorded on the 3D optical memory 560 using interference fringes between the incident split light 521 and 522 as the storage data At step S330, the storage data may be recorded on the 3D optical memory 560 using 3D data, that is, interference fringes between the incident split light 521 and 522, as the storage data.

For example, the 3D data may be data arranged in a 3D array form.

The 3D optical memory 560 may be memory using photorefractive materials.

At step S330, the storage data may be recorded on the 3D optical memory 560 through parallel processing in different recording directions.

At step S330, the storage data may be recorded in a multiplex manner under a plurality of recording conditions.

At step S330, the storage data may be recorded in a multiplex manner by adding an identification code to the storage data.

At step S330, diffused reflection may be performed on the second split light 522 using the 3D subject 551, and the resulting light may be incident on the 3D optical memory 560 via the lens 552.

At step S330, 3D data having the form of the 3D subject 551 may be recorded as the storage data.

Figure 4:
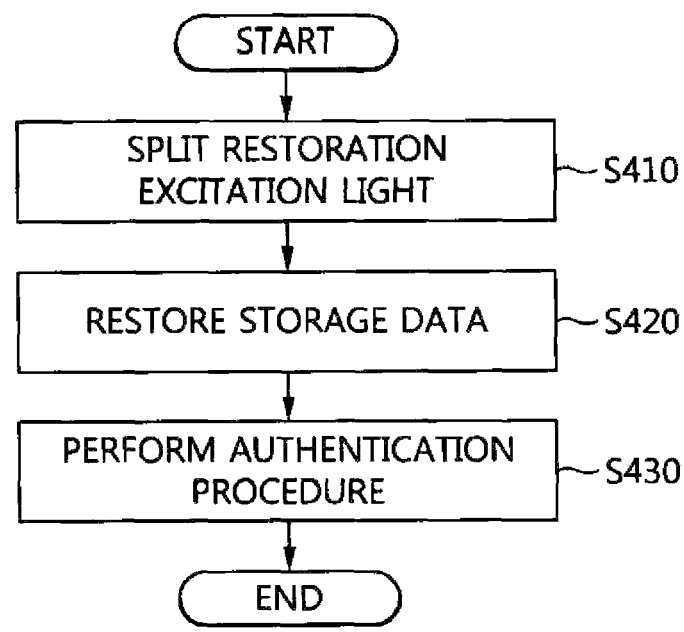
FIG. 4 is a flowchart illustrating an authentication method using 3D optical memory according to an embodiment of the present invention.

FIG. 4 is a flowchart illustrating an authentication method using 3D optical memory according to an embodiment of the present invention.

Referring to FIG. 4, in the authentication method using 3D optical memory according to an embodiment of the present invention, the excitation light 520 is split into the first split light 521 and the second split light 522 at step S410.

The first split light 521 may be reference light, and the second split light 522 may be object light.

Furthermore, in the authentication method using 3D optical memory according to an embodiment of the present invention, storage data is restored by making the first split light 521 incident on the 3D optical memory 560 through the reflection mirror 541 in accordance with recording conditions at step S420.

The recording conditions include information about the waveform, wavelength and phase of the first split light 521, information about the rotation of the excitation light source 510, information about the arrangement of the reflection mirror 541 configured to reflect the first split light 521, and recording coordinates within the 3D optical memory 560, which have been stored by the data recording apparatus using 3D optical memory.

The recording conditions may further include information about the incident location and angle of the first split light 521 that is incident on the 3D optical memory 560.

The recording conditions may further include an identification code if the identification code has been added to the storage data by the data recording apparatus using 3D optical memory.

At step S420, 3D data having the form of the 3D subject 551 may be restored from the storage data.

For example, the 3D data may be data arranged in a 3D array form.

The 3D optical memory 560 may be memory using a photorefractive material.

At step S420, the storage data may be restored in the 3D optical memory 560 through parallel processing in different restoration directions.

At step S420, the storage data recorded by the data recording apparatus using 3D optical memory in a multiplex manner under a plurality of recording conditions may be restored, under the plurality of recording conditions.

At step S420, combination data, that is, a combination of one or more of the storage data recorded by the data recording apparatus using 3D optical memory in a multiplex manner under a plurality of recording conditions, may be restored.

Furthermore, in the authentication method using 3D optical memory according to an embodiment of the present invention, an authentication procedure is performed using the restored storage data and previously registered authentication data at step S430.

The authentication execution unit 230 may restore the>combination data, and may perform an authentication procedure using the restored combination data as the previously registered authentication data.

As described above, the authentication execution unit 230 can update authentication data by restoring combination data based on the combination even without additional data recording.

Figure 5:
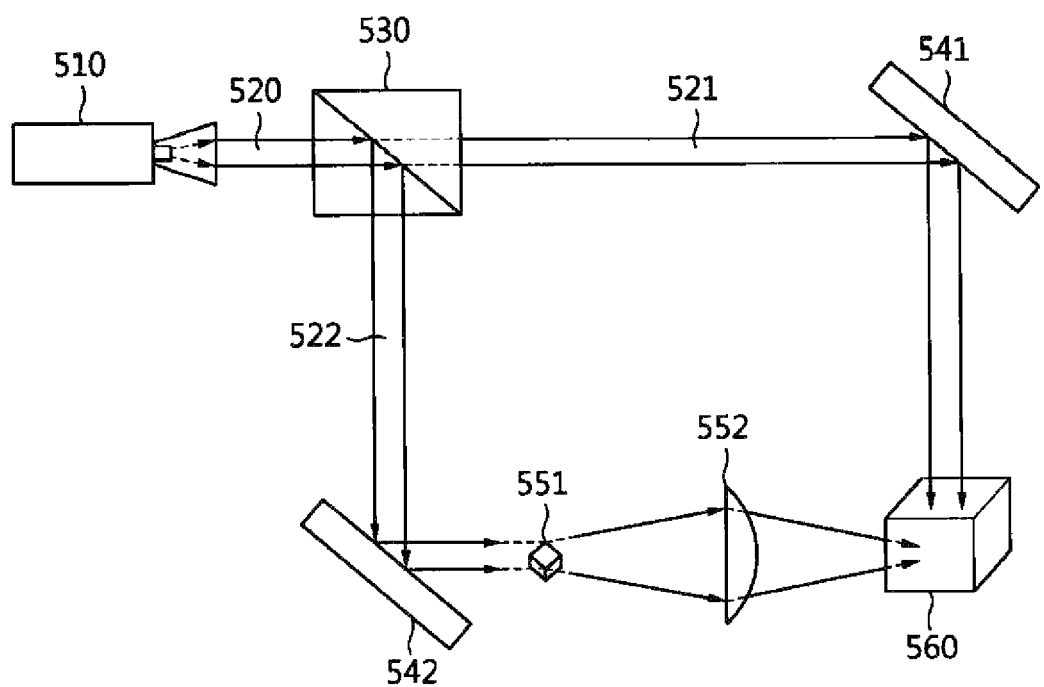
FIG. 5 is a diagram illustrating an example of storage data recording using the data recording unit of the present invention.

FIG. 5 is a diagram illustrating an example of storage data recording using the data recording unit 130 of the present invention.

From FIG. 5, it can be seen that the data recording unit 130 of the present invention records storage data on the 3D optical memory 560 by making the split light 521 and 522 into which the excitation light 520 generated from the excitation light source 510 is split by an optical splitter 530, incident on the 3D optical memory 560 through the reflection mirrors 541 and 542.

It can also be seen that the data recording unit 130 performs diffused reflection on the second split light 522 using the 3D subject 551 and makes the resulting light on the 3D optical memory 560 through the lens 552.

The data recording unit 130 may record the storage data on the 3D optical memory 560 using interference fringes between the pieces of incident split light 521 and 522 as the storage data.

The data recording unit 130 may record the storage data on the 3D optical memory 560 using 3D data, that is, interference fringes between the pieces of incident split light 521 and 522, as the storage data.

For example, the 3D data may be data arranged in a 3D array form.

The 3D optical memory 560 may be memory using a photorefractive material.

The data recording unit 130 may record the storage data on the 3D optical memory 560 through parallel processing in different recording directions.

The data recording unit 130 may record the storage data in a multiplex manner under a plurality of recording conditions.

The data recording unit 130 may record the storage data in a multiplex manner by adding an identification code to the storage data.

The data recording unit 130 may record 3D data having the form of the 3D subject 551 as the storage data.

The condition storage unit 120 may store recording conditions including information about the waveforms, wavelengths and phases of the split light 521 and 522 and information about the rotation of the excitation light source 510.

The recording conditions may further include information about the arrangement of the reflection mirrors 541 and 542 configured to reflect the split light 521 and 522.

The recording conditions may further include recording coordinates within the 3D optical memory 560.

The recording conditions may further include information about the incident locations and, angles of the split light 521 and 522 that are incident on the 3D optical memory 560.

The recording conditions may further include an identification code.

Figure 6:
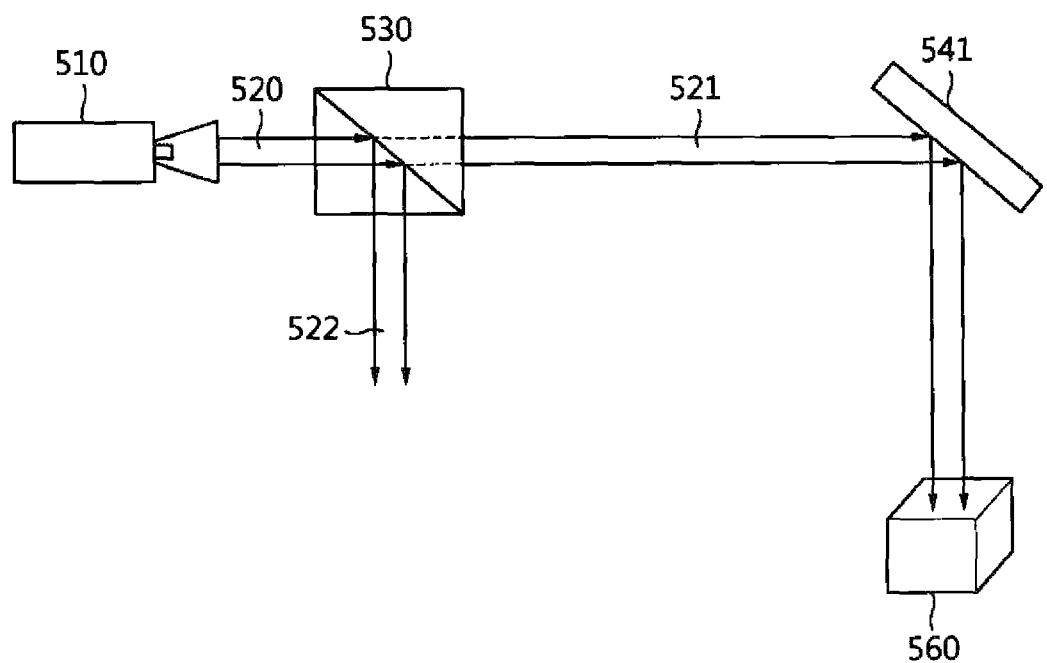
FIG. 6 is a diagram illustrating an example of storage data restoration using the data restoration unit of the present invention.

FIG. 6 is a diagram illustrating an example of storage data restoration using the data restoration unit 220 of the present invention.

From FIG. 6, it can be seen that the data restoration unit 220 of the present invention restores storage, data by making the first split light 521, which belongs to the split light 521 and 522 into which the excitation light 520 generated from the excitation light source 510 is split by the optical splitter 530, incident on the 3D optical memory 560 through the reflection mirror 541.

The data restoration unit 220 restores the storage data under the recording conditions.

The recording conditions may include information about the waveform, wavelength and phase of the first split light 521 and information about the rotation of the excitation light source 510, which have been stored by the data recording apparatus using 3D optical memory.

The recording conditions may further include information about the arrangement of the reflection mirror 541 configured to reflect the first split light 521.

The recording conditions may further include recording coordinates within the 3D optical memory 560.

The recording conditions may further include an identification code if the identification code has been added to the storage data by the data recording apparatus using 3D optical memory.

The data restoration unit 220 may restore 3D data having the form of the 3D subject 551 from the storage data.

For example, the 3D data may be data arranged in a 3D array form.

The 3D optical memory 560 may be memory using a photorefractive material.

The data restoration unit 220 may restore the storage data in the 3D optical memory 560 through parallel processing in different restoration directions.

The data restoration unit 220 may restore the storage data, recorded by the data recording apparatus using 3D optical memory in, a multiplex manner under a plurality of recording conditions, under the plurality of recording conditions.

The data restoration unit 220 may restore combination data, that is, a combination of one or more of the storage data recorded by the data recording apparatus using 3D optical memory in a multiplex manner under a plurality of recording conditions.

As described above, the data recording apparatus and method and the authentication apparatus and method using 3D optical memory according to the present invention are not limitedly applied to the constructions and methods according to the above-described embodiments, but some of or all the embodiments may be selectively combined so that the present invention is modified in various ways.

As described above, according to the present invention, more high-precision recording is enabled by recording different storage data in a multiplex manner by changing information about the waveforms, wavelengths and phases of light used upon recording, information about the rotation of an excitation light source, and recording coordinates within 3D optical memory in various ways, using the 3D optical memory.

Furthermore, more rapid recording and restoration are enabled by recording and restoring storage data through parallel processing in different recording directions.

Furthermore, safer authentication is enabled by using high-complexity recording conditions, such as information about the waveforms, wavelengths and phases of light used upon recording, information about the rotation of an excitation light source, and recording coordinates within 3D optical memory, as restoration conditions.

Furthermore, authentication data can be updated more conveniently using restoration data, that is, a combination of already recorded storage data, by solving a problem in which additional data recording is required whenever authentication data is updated in the case where 2D optical memory is used.

Although the preferred embodiments of the present invention have been disclosed for illustrative purposes, those skilled in the art will appreciate that various modifications, additions and substitutions are possible, without departing from the scope and spirit, of the invention as disclosed in the accompanying claims.

What is claimed is:

1. A data recording apparatus using three dimensional (3D) optical memory, comprising:
   a recording excitation light splitting unit configured to split recording excitation light into first split light and second split light;
   a condition storage unit configured to store recording conditions including information about waveforms, wavelengths and phases of the first and second split light and information about an arrangement of reflection mirrors configured to reflect the first and second split light; and
   a data recording unit configured to record storage data in a multiplex manner under a plurality of the recording conditions by making the first and second split light incident on the 3D optical memory through the reflection mirrors under the recording conditions.

2. The data recording apparatus of claim 1, wherein the recording conditions further comprise information about incident locations and angles of the first and second split light incident on the 3D optical memory.

3. The data recording apparatus of claim 2, wherein the data recording unit records the storage data on the 3D optical memory through parallel processing in different recording directions.

4. The data recording apparatus of claim 3, wherein the data recording unit performs diffused reflection on the second split light using a 3D subject, and makes resulting light incident on the 3D optical memory through a lens.

5. An authentication apparatus using three dimensional (3D) optical memory, comprising:
   a restoration excitation light splitting unit configured to split restoration excitation light into first split light and second split light;
   a data restoration unit configured to restore storage data by making the first split light incident on the 3D optical memory through a reflection mirror under recording conditions including information about waveforms, wavelengths and phases of the first and second split light, information about a rotation of an excitation light source, and information about an arrangement of a reflection mirror configured to reflect the first split light, which have been stored by a data recording apparatus using 3D optical memory; and
   an authentication execution unit configured to perform an authentication procedure using the restored storage data and previously registered authentication data,
   wherein the data restoration unit restores the storage data, recorded by the data recording apparatus using 3D optical memory in a multiplex manner under a plurality of the recording conditions, under the plurality of the recording conditions.

6. The authentication apparatus of claim 5, wherein the recording conditions further include information about incident locations and angles of the first and second split light incident on the 3D optical memory.

7. The authentication apparatus of claim 6, wherein the data restoration unit restores the storage data on the 3D optical memory through parallel processing in different recording directions.

8. The authentication apparatus of claim 7, wherein the data restoration unit restores combination data of one or more of the storage data recorded by the data recording apparatus using 3D optical memory in a multiplex manner under a plurality of recording conditions.

9. An authentication method using dimensional (3D) optical memory, comprising:

splitting restoration excitation light into first split light and second split light;

restoring storage data by making the first split light incident on the 3D optical memory through a reflection mirror under recording conditions including information about waveforms, wavelengths and phases of the first and second split light, information about a rotation of an excitation light source, and information about an arrangement of a reflection mirror configured to reflect the first split light, which have been stored by a data recording method using 3D optical memory; and performing an authentication procedure using the restored storage data and previously registered authentication data, wherein restoring the storage data comprises restoring the storage data, recorded by the data recording method using 3D optical memory in a multiplex manner under a plurality of the recording conditions, under the plurality of the recording conditions.

10. The authentication method of claim 9, wherein the recording conditions further include information about incident locations and angles of the first and second split light incident on the 3D optical memory.

11. The authentication method of claim 10, wherein restoring the storage data comprises restoring the storage data on the 3D optical memory through parallel processing in different recording directions.

12. The authentication method of claim 11, wherein restoring the storage data comprises restoring combination data of one or more of the storage data recorded by the data recording method using 3D optical memory in a multiplex manner under the plurality of the recording conditions.

* * * * *